Jan. 13, 1953  R. A. GAISER ET AL  2,625,640
MULTIPLE GLASS SHEET GLAZING UNIT

Filed Aug. 5, 1950  2 SHEETS—SHEET 1

Inventors
Romey A. Gaiser and
Charles M. Browne
Nobbe & Swope
Attorneys

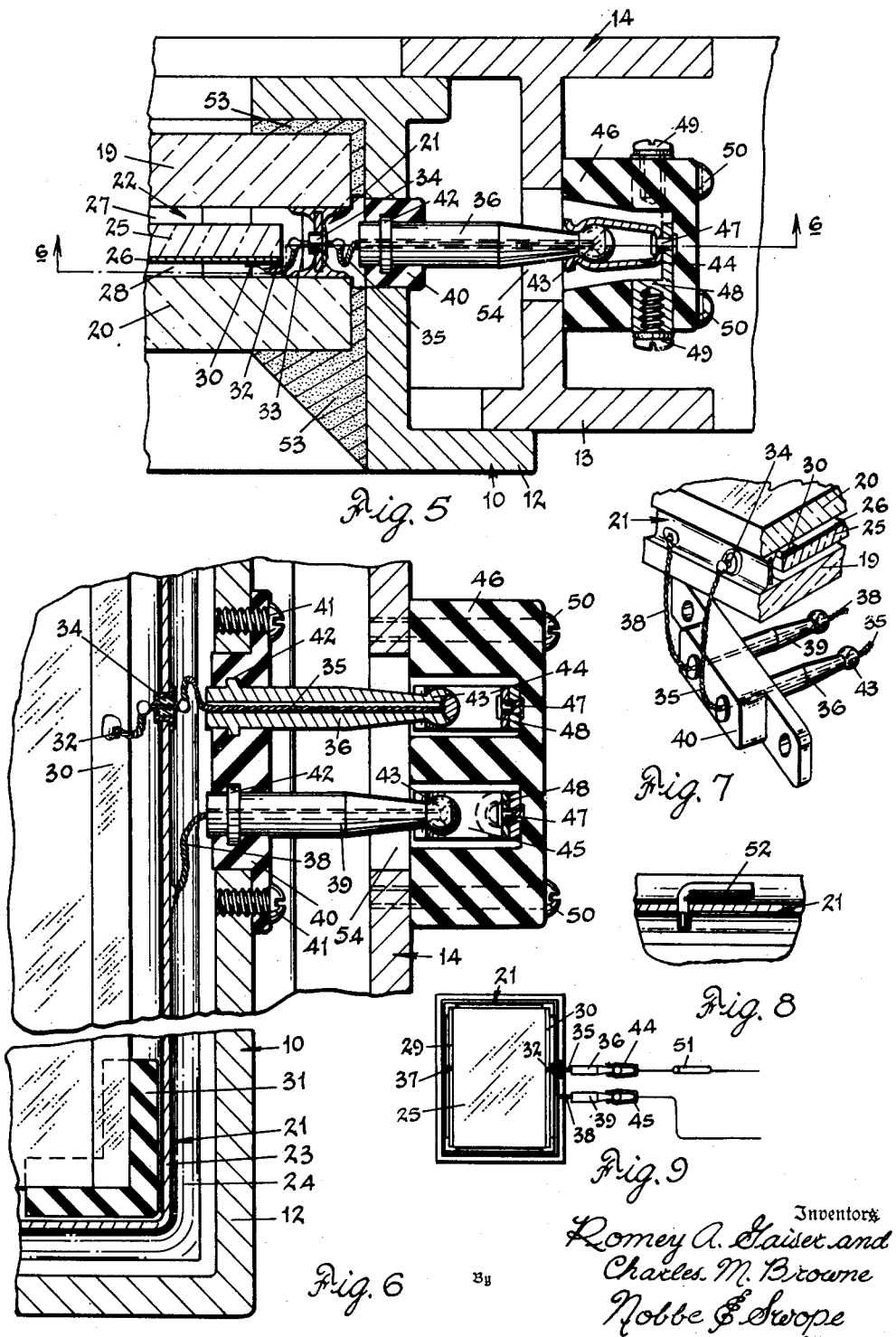

Patented Jan. 13, 1953

2,625,640

UNITED STATES PATENT OFFICE 2,625,640

MULTIPLE GLASS SHEET GLAZING UNIT

Romey A. Gaiser and Charles M. Browne, Toledo, Ohio, assignors to Libbey-Owens-Ford Glass Company, Toledo, Ohio, a corporation of Ohio Application August 5, 1950, Serial No. 177,948

9 Claims. (Cl. 219—19)

1

The present invention relates broadly to a multiple glass sheet glazing unit and more particularly to a unit wherein one or more electrically conducting panels are disposed between the spaced glass sheets of the glazing unit.

Generally speaking, multiple glass sheet glazing units comprise two or more sheets of glass spaced apart by suitable separating means which are bonded directly, or through the intermediary of a suitable coating or coatings to the glass sheets entirely around their perimeters or marginal portions. By thus arranging the glass sheets in spaced relation by separator means there is created an hermetically sealed spacer or spaces between the glass sheets to provide an insulating structure for reducing heat transfer and to reduce, if not prevent, condensation of moisture upon glass in glazed openings.

Although certain types of such units have proved entirely satisfactory under normally variable weather conditions, it was found that the efficiency of some glazing units under extreme or severe climatic or atmospheric conditions could be improved by interposing between the spaced glass sheets one or more glass sheets or other panels having one or both surfaces thereof provided with an electrically conducting coating or film.

It is therefore an aim of this invention to provide a multiple glass sheet glazing unit of novel construction in which undesirable moisture condensation under severe or extreme atmospheric or climatic conditions is substantially eliminated by mounting one or more electrically conducting panels between the spaced glass sheets of the unit.

Another object of the invention is the provision of a multiple glass sheet glazing unit so constructed that the air within the unit and likewise the glass sheet adjacent the room side are heated by means of one or more panels, the surface or surfaces of which are coated by an electrically conducting film.

Another object of the invention is the provision of a multiple glass sheet glazing unit of the above character having novel means associated therewith for supporting the electrically conducting panel and for maintaining said panel spaced from the separator means and glass sheets.

A further object of the invention is the provision of electric switching means for the above described glazing unit for making contact with the electrically conducting film and which eliminates flexible leads or connectors and the attending hazard of exposed electric wires whose insulation is subject to deterioration and damage.

2

A still further object of the invention is to provide a releasably engageable switch mechanism whereby current will be caused to flow to the electrically conducting film upon closure of the glazing unit with respect to a window opening and the circuit broken when said unit is moved outwardly from the window opening.

Other objects and advantages of the invention will become more apparent during the course of the following description when taken in connection with the accompanying drawings.

In the drawings, wherein like numerals are employed to designate like parts throughout the same:

Fig. 5 is an enlarged section taken substantially on line 5—5 of Fig. 1;

Fig. 6 is a sectional view taken substantially on line 6—6 of Fig. 5;

Fig. 7 is a view of the electrical connections for transmitting current to the electrically conducting panel;

Fig. 8 is a fragmentary detail view showing a breather tube embedded in the separator means of the glazing unit; and Fig. 9 is a diagrammatic illustration of the electrical system of the glazing unit.

Figure 1:
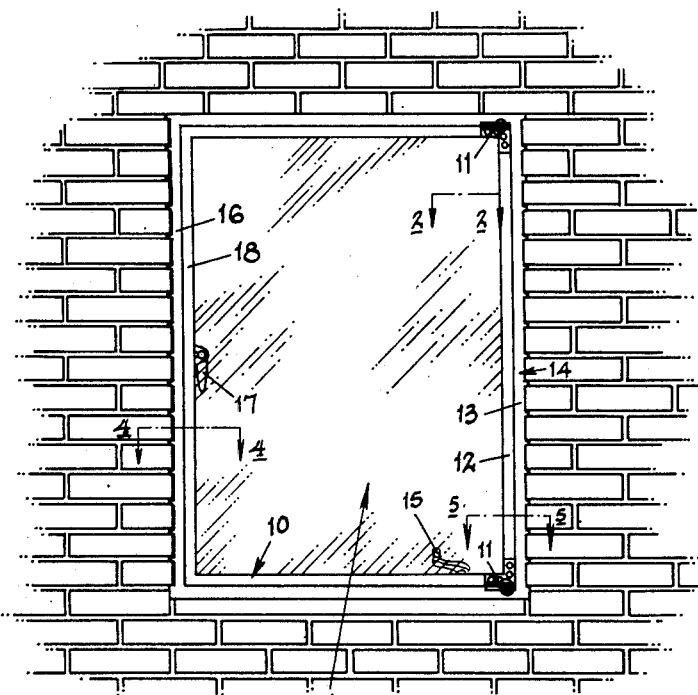
Fig. 1 is a front elevation of a multiple glazing unit constructed in accordance with the invention and mounted for swinging movement in a window opening.

Referring now to the drawings, there is shown in Fig. 1 a multiple glass sheet glazing unit A carried in a suitable rectangular frame 10 which is movable outwardly with respect to the window opening by means of hinges 11 attached to a vertical member 12 of the frame 10 and to the mullion 13 of the outer casing 14. If desired, the frame 10 and unit A mounted therein, may be swung outwardly by means of a crank 15 and when closed, locked to the opposite mullion 16 by a locking handle 17 carried on the inner surface of the other vertical member 18 of the frame 10.

The multiple glass sheet glazing unit of this invention is preferably composed of two sheets of glass 19 and 20 arranged in spaced face to face relation to each other and maintained in this position by a metal separator means 21 to provide an hermetically sealed air chamber 22 therebetween. The separator means 21 may consist of a lead tape or equivalent 23 and is permanently secured to the opposed faces of the glass sheets inwardly of their edges through the intermediary of the metallic coatings 24 deposited on and tightly adherent to the marginal portions of the glass sheets. After the glass sheets have been associated with the separator means, the spacer 21 is punctured with a needle in at least two places so that clean, dry air may be passed through the chamber 22 between the sheets to remove moisture and to make it possible to leave clean, dry air sealed within the unit. Such a unit is more fully described in Patent No. 2,235,681, dated March 18, 1941. However, it will be appreciated, that this invention is not restricted to the particular unit described above but is of equal application to other types of units.

Figure 2:
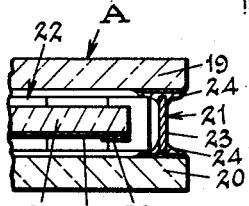
Fig. 2 is a sectional view taken substantially on line 2—2 of Fig. 1.
Figure 3:
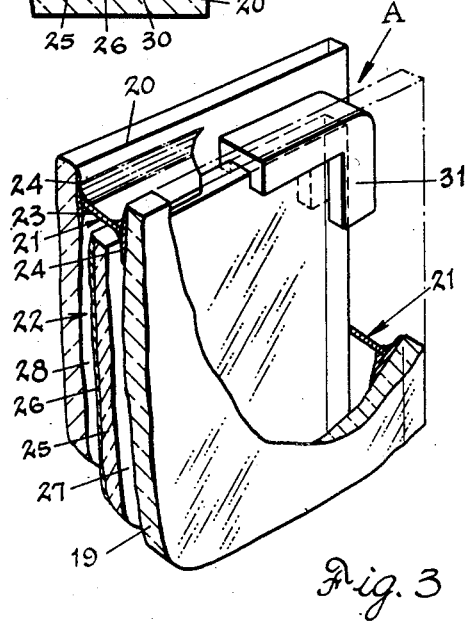
Fig. 3 is a fragmentary perspective view showing particularly the means for supporting the electrically conducting panel.
Figure 4:
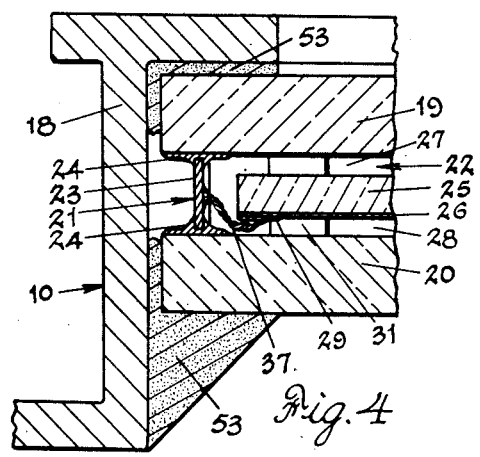
Fig. 4 is an enlarged section taken substantially on line 4—4 of Fig. 1.

As illustrated in Figs. 2–4, there is positioned within the chamber between the spaced glass sheets 19 and 20 a panel 25 which may comprise a sheet of glass having at least one surface thereof coated with an electrically conducting material, such as for example, tin oxide, as disclosed in Patent No. 2,429,420, dated October 21, 1947. When applied according to the method therein described, there is provided on an electrically non-conductive surface, such as glass, a thin transparent coating or film 26 possessing the property of electrical conductivity, said coating being clear, hard and tenacious and of uniform thickness.

It has been found that an adequate thermal barrier is erected within the unit when only one surface of the glass sheet 25 is filmed or coated and that surface faced outwardly with respect to the window opening. However, if desired, both surfaces of the glass sheet 25 could be coated and the temperatures of each separately controlled. In addition, in a glazing unit comprising more than two spaced sheets of glass, additional sheets of filmed or coated glass may be positioned therebetween resulting in correspondingly increased heating for the entire unit.

The coated glass sheet 25 is arranged in spaced relation to the glass sheets 19 and 20 and also to the separator means 21 to divide the chamber 22 into spaces 27 and 28 which communicate with one another around the edges of the panel 25. Although it is not certain, it is felt that upon the application of electrical energy to the film 26 heat energy is radiated substantially perpendicularly from the film, that is, in opposite directions from the film 26. A portion of the heat energy enters the air space 28 adjacently parallel the film and another portion radiates through the glass sheet 25 into the air space 27 adjacent said sheet.

Inasmuch as the inner glass sheet 19 is at a higher temperature than the outer sheet 20, due to its adjacency to a relatively warm room, the air space 27 parallel to the inner sheet will be heated to a higher degree than the air space 28 adjacent the film 26 and convection currents set in motion moving upwardly with respect to the unit A.

Now, since the outer glass sheet 20 is at a much lower temperature due to its adjacency to the cold air mass outside, the air space 28 parallel to the outer sheet will be at a relatively lower temperature, and, although substantially the same amount of heat energy is radiated in both directions from the film 26, the latter air space will not be heated to the same degree as the space adjacent the inner sheet 19. As a further explanation of the relatively lower temperature of the outer glass sheet 20, it is known that the stannic oxide film has a low emissivity and is therefore a good reflector of infra-red rays. Therefore, under steady state conditions, that surface of the glass sheet 25 opposite the filmed surface reaches a relatively higher temperature and the heat energy so radiated serves to raise the temperature of the air space 27.

Because of the differences in the temperatures of the air spaces on opposite sides of the filmed glass sheet 25, the heat energy radiated through the sheet 25 will have the effect of forcing movement of the relatively small amount of air within the sealed unit A. As the air circulates within the unit it will be heated to a relatively high temperature as it passes in front of the non-filmed surface of the glass sheet 25 and will not be heated to an appreciable degree as it passes before the filmed surface, due to the presence of the cold outer sheet of glass 20. Since the air circulating adjacent the inner glass sheet 19 is heated to a relatively higher temperature, not only will condensation of moisture on said glass sheet be substantially eliminated, but heat energy will be radiated through the inner glass sheet 19 and will substantially preclude any possibility of discomfort to a person sitting immediately adjacent the window unit on a severely cold day.

A unit possessing the above desirable quality of substantially eliminating condensation of moisture is of special application in the glazed openings of refrigerated display cabinets. In such construction, the filmed surface of the coated glass sheet is faced inwardly to the cold interior of the cabinet and the unit functions in the manner above described to substantially prevent the formation of moisture on the glass sheet facing outwardly of the cabinet.

For the purpose of supplying electric power to the coating or film 26 there is carried by said coating, vertically of the glass sheet 25 and substantially coextensively the edges thereof, two electrodes 29 and 30. As will be more fully hereinafter described, the electrode 29 is grounded to the lead separator strip 21 and the electrode 30 connected through the separator strip to a source of electric current.

Inasmuch as it is essential that the edges of the coated glass sheet 25 do not contact the lead separator strip 21, and thereby cause electrical short circuiting, there is herein provided means for maintaining the filmed glass sheet in spaced relation to the glass sheets 19 and 20 and to the lead separator strip. Such means may be in the form of grooved corner blocks 31 which fit over the four corners of the glass sheet 25. These blocks may be made of any material which has sufficient structural strength and a low volatile content, and for this purpose Masonite, Bakelite, methacrylate, phenolite and other similar materials may be used. As may be seen in Fig. 3, these blocks are preferably grooved in the central portion thereof in order to fit snugly over the glass sheet 25.

As has been noted, electricity is supplied to the electrically conductive glass sheet 25 by a connection from a source of power through the lead separator strip 21 to the electrode 30 carried by the coating 26. The other connection is grounded to the separator strip through the other electrode 29.

More particularly, as shown in Fig. 5, there is attached to the electrode 30 by any suitable means, as by solder, one end of a relatively short wire 32 which is affixed at its opposite end to a wire 33 fused into a glass insulator 34. The glass insulator, which may be in the form of a bead, is suitably attached, as by soldering, to the separator strip 21 to produce an hermetically sealed and insulated lead-in wire. Attached to the other end of the wire 33 is a lead 35 which extends through the central portion of a molded or threaded hollow stud 36, as may be seen in Fig. 6.

Another electrode 29, which is carried by the electrically conductive coating 26 along the opposite marginal side of the glass sheet 25, is connected to the lead separator means 21, as shown in Fig. 4, by means of a wire 37. This wire may be soldered to the electrode and separator strip, or connected thereto in any other suitable manner.

The circuit through the separator strip is completed by a connection from the separator 21 at a point on the opposite side portion of the glass sheet 25 and preferably adjacent the electrode 30. As seen in Fig. 6 this connection is made by a wire 38 suitably attached to said separator, as by solder. This wire runs through the molded or threaded hollow stud 39 and is connected to the end thereof, as will be more fully hereinafter described.

Each molded or threaded hollow stud 36 and 39 may be formed from any suitable material, such as, for example, a metallic alloy or non-alloy, plastic or ceramic composition and may be either molded directly into the insulator 40 or may be threaded to form a member detachable from the insulator. Screws or the like 41 may be used to attach the molded insulator 40 to the rectangular window frame 10. Each stud has preferably formed thereon a collar 42 to substantially eliminate movement of the stud within the insulator upon opening and closing of the window unit. As may be seen in Fig. 6, the insulator 40 is fitted into the window frame opposite the point where connection is made from the electrode through the metalized glass insulator or bead 34.

The end or tip portion 43 of each stud 36 and 39 makes electrical contact upon the closing of the window unit by being received within spring connectors 44 and 45 respectively, which are attached to a stand-off block 46 mounted inside the mullion 13. By so locating the connectors within the stand-off block and attaching the latter within the mullion, the connectors are adequately enclosed and any possibility of shock by a person contacting the connectors is substantially precluded. Each spring connector is suitably attached to the base of the block 46, as by rivets 47, said rivets also passing through the base portion of electric contacting means 48, molded into the stand-off block. For the purpose of attaching the power leads thereto, the contacting means carries connecting screws 49. As is shown in Fig. 6, the stand-off block 46 is attached to the mullion by any suitable means, as by screws or bolts 50.

Electric power to heat the coated glass sheet may be supplied from normal house current of 110 v. A. C.-D. C. It will be seen in Fig. 9 that one path of electric current is through a switch 51 to the spring connector 44 and then through the stud 36 and lead 35, the latter being connected to the electrode 30 on the coating 26 by means of the wire 32. Electric current may be grounded to the lead separator strip 21 by the wire 37, said current then passing through the separator and through the hollow stud 39 to the spring connector 45.

If desired, in order to more accurately control the temperature of the electrically conducting film 26 on the glass sheet 25, a thermostat may be positioned at any convenient location within the unit A. This thermostat may be of the preset bimetal contact type and could be arranged to either sense the temperature of the air within the unit or the temperature of the inner glass sheet 19, outer glass sheet 20 or the coated glass sheet 25, whichever seems more desirable.

Should it be desired to operate the unit of this invention at a temperature in excess of contemplated usage, that is, when it would be desirable to heat the air within the unit above normal temperatures, thereby necessitating a greater input of electrical power and resulting in a greater expansion of the residual air, there may be provided a hollow venting or breather tube 52, as shown in Fig. 8. This tube extends through the separator means 21 and one leg thereof lies parallel to said separator. It is to be understood, however, that under normal operating conditions the tube is not necessary as the unit is so constructed as to compensate for an internal expansion greater than would be caused by normal functioning. That is, the unit is constructed to operate under severe climatic and atmospheric conditions and when in such use would not incorporate the breather tube as a part.

As has been noted, the present invention is particularly suitable under severe climatic or atmospheric conditions. On extremely cold winter days use of this multiple glazing unit substantially eliminates discomfort to a person sitting immediately adjacent the window. Furthermore, any possibility of condensation upon the glass sheets under severe climatic and atmospheric conditions is substantially precluded by the interposition of a heated glass sheet between the spaced glass sheets. As has been noted above, the stannic oxide film has a low emissivity and therefore is highly reflective to infra-red rays. This property of the film allows the present invention to provide a very desirable cooling effect during the warm summer months. That is, due to the reflective properties of the film infra-red rays from the sun are radiated outwardly from the film and do not entirely pass through the unit. By this novel feature of the invention, the temperature of the room remains at a relatively low temperature in contrast to the temperature outside and thereby additional comfort is granted the occupants of a room wherein the window openings are glazed with the present unit.

Experimental data have been collected which substantiates the belief that the undesirable conditions of condensation of moisture and a cold region immediately adjacent the window unit may be substantially, if not entirely, eliminated by the use of the present invention. This data was obtained by glazing a typical double glass sheet glazing unit in one side of a box and glazing the present unit in the opposite side of the box. The box was 24" high x 18" wide x 18" deep. Dry Ice was loaded on the bottom of the box and a fan circulated cold air within the box. Both glass units were about 18" x 24" in size with each unit having ½" air spaces. Thermocouples were soldered to metallized spots on both outside surfaces of both units. These thermocouples were located at the intersection of imaginary diagonal lines connecting the corners of the unit.

It appears from these data that at a room temperature of 75° F. and an outside air temperature of 0° F. with a wind velocity of 10 M. P. H., 40 watts per square foot supplied to the coated or filmed glass sheet within the present double glazing unit will maintain a glass room surface temperature of at least 70° F. Similar conditions with a typical double glass sheet glazing unit will produce a glass room surface temperature of approximately 50° F.

It has been computed that approximately 12 watts per square foot are lost through a regular ½" air space double glass sheet glazing unit built of ⅛" glass due to the temperature differences specified above. The additional 28 watts of the 40 watts supplied the unit of the present invention is used to heat the inside and outside atmospheres. In other words, the 40 watts is not expended in providing a thermal barrier alone. Twelve watts of the total power provides a thermal barrier while the remainder supplies heat to surrounding objects.

Thus it may be seen that it is possible by properly adjusting the input of electric power to this novel unit to raise the temperature of the inner glass sheet whereby condensation of moisture and discomfort to a person sitting immediately adjacent the window unit on an abnormally cold winter day are rendered substantially remote.

Not only does the present glazing unit substantially eliminate the above mentioned conditions, but is of relatively low cost, simple construction and efficient operation.

In the assembly or construction of the unit the separator means 21 is attached to one plate of glass 20 according to the method disclosed in Patent No. 2,235,681 dated March 18, 1941. The electrically conductive glass sheet 25 with grooved corner blocks 31 attached thereto is positioned within the opening created by the separator on the glass sheet 20. One electrode 29 is connected through the wire 37 to the separator 21, as by soldering, and the other electrode 30 suitably attached through the wire 32 to the wire 33 traversing the glass or insulator bead 34. The other plate of glass 19 is then soldered to the separator strip, as described in the above mentioned patent.

The glazing unit A as thus assembled is then mounted in a suitable rectangular frame 10 and secured therein by the application of a glazing compound 53 on the marginal portions of the glazing unit facing outwardly along the juncture of the unit and vertical members 12 and 18 and also along the inner surface of the unit between said unit and said vertical members.

The vertical member 12 of the frame 10 has a relatively small section cut away for insertion of the insulator 40 with hollow studs 36 and 39 mounted therein. The lead 35 is then soldered to the wire 33 through the glass bead 34 and the wire 38 suitably attached, as by solder, to the separator means 21 at a point preferably adjacent the glass insulator 34.

The lead 35 and wire 37 are then fed through the hollow studs 36 and 39 respectively, until they extend beyond the end or tip portions 43 thereof, as shown in Fig. 7. The insulator 40 is affixed to the frame 10 by screws 41 and the wires 35 and 37 turned back into the ends 43 of the studs 36 and 39 and soldered thereto.

A hole 54 is then drilled in the mullion 13 at the point where the studs 36 and 39 will pass through the mullion. A stand-off block 46, with spring connectors 44 and 45 molded or otherwise affixed therein, is then attached inside the mullion, as by screws or bolts 50, so that the studs will enter the spring connectors.

The glazing unit A as thus assembled and mounted within the rectangular frame 10 is next positioned in the window opening and the vertical member 12 of the frame attached to the mullion 13 by suitable hinges 11. As has been noted there is herein provided a crank 15 for moving the assembled unit A outwardly and inwardly and also a locking handle 17 to secure the unit in the frame 10 to the mullion 16.

Thus, as the frame 10 with unit A mounted therein is moved inwardly of the window opening by means of the crank 15, the studs 36 and 39 carried by the vertical member 12 of said frame 10 will be engaged by the spring connectors 44 and 45 respectively and, assuming the switch 51 (Fig. 9) is in the closed position, current will flow through said studs to the film or coating 26 as above described and heat energy emitted thereby. Also, should the window unit be moved outwardly on the hinges 11 by the crank 15 when the switch 51 is in the closed position, the spring connectors 44 and 45 will release the studs 36 and 39 respectively and the circuit thereby broken.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

We claim:

1. A multiple glazing unit, comprising two sheets of glass spaced from one another to provide a chamber therebetween, separator means arranged between the glass sheets around the marginal portions thereof, a panel arranged between the glass sheets, means for supporting the panel in spaced relation to the separator means, an electrically conductive coating carried by said panel, and means connected with said coating for transmitting current thereto.

2. A multiple glazing unit, comprising two sheets of glass spaced from one another to provide a chamber therebetween, separator means arranged between the glass sheets around the marginal portions thereof, a glass panel arranged between the glass sheets in spaced relation thereto, means for supporting the panel in spaced relation to the separator means and to the glass sheets, an electrically conductive coating upon a surface of said glass panel, and means connected with said coating for transmitting current thereto.

3. A multiple glazing unit, comprising two sheets of glass spaced from one another to provide a chamber therebetween, separator means arranged between the glass sheets around the marginal portions thereof and secured thereto, a glass panel arranged between the glass sheets and spaced from the inner adjacent surfaces thereof, the edges of said panel being disposed inwardly of the edges of the glass sheets, means for supporting the panel in spaced relation to the separator means and to the glass sheets, an electrically conductive coating upon the outwardly facing surface of said glass panel, and means connected with said coating for transmitting current thereto.

4. A multiple glazing unit, comprising two sheets of glass spaced from one another to provide a chamber therebetween, separator means arranged between the glass sheets around the marginal portions thereof, a panel arranged between the glass sheets and spaced from the inner adjacent surfaces thereof, an electrically conductive coating upon a surface of said panel, means formed of an insulating material for supporting the panel in spaced relation to the separator means and to the glass sheets, and means connected with said coating for transmitting current thereto.

5. A multiple glazing unit, comprising two sheets of glass spaced from one another to provide a chamber therebetween, metallic separator means arranged between the glass sheets around the marginal portions thereof and secured thereto, a glass panel arranged between the glass sheets and spaced from the inner adjacent surfaces thereof, an electrically conductive coating upon the outwardly facing surface of said glass panel, means formed of an insulating material for supporting the panel in spaced relation to the separator means and to the glass sheets, and means connected with said coating for transmitting current thereto.

6. A multiple glazing unit, comprising two sheets of glass spaced from one another to provide a chamber therebetween, separator means arranged between the glass sheets around the marginal portions thereof, a panel arranged between the glass sheets and spaced from the inner adjacent surfaces thereof, an electrically conductive coating upon a surface of said panel, electrodes carried along two opposite marginal edges of the panel and contacting the electrically conductive coating, electrical connections passing through the separator means and connected with said electrodes, and means formed of an insulating material for supporting said panel in spaced relation to the separator means and to the glass sheets.

7. A multiple glazing unit, comprising two sheets of glass spaced from one another to provide a chamber therebetween, metallic separator means arranged between the glass sheets around the marginal portions thereof and secured thereto, a glass panel arranged between the glass sheets and spaced from the inner adjacent surfaces thereof, an electrically conductive coating upon the outwardly facing surface of said glass panel, electrodes carried along two opposite marginal edges of the panel and contacting the electrically conductive coating, electrical connections passing through the separator means and connected with said electrodes, and means formed of an insulating material for supporting said panel in spaced relation to the separator means and to the glass sheets.

8. A multiple glazing unit, comprising two sheets of glass spaced from one another to provide a chamber therebetween, metallic separator means arranged between the glass sheets around the marginal portions thereof, a panel arranged between the glass sheets and spaced from the inner adjacent surfaces thereof, an electrically conductive coating upon a surface of said panel, electrodes carried along two opposite marginal edges of the panel and contacting the electrically conductive coating, electrical connections passing through the metallic separator means and connected with said electrodes, means insulating the connections from the metallic separator, and means formed of an insulating material for supporting the panel in spaced relation to the separator means and to the glass sheets.

9. A multiple glazing unit, comprising two sheets of glass spaced from one another to provide a chamber therebetween, metallic separator means arranged between the glass sheets around the marginal portions thereof and secured thereto, a glass panel arranged between the glass sheets and spaced from the inner adjacent surfaces thereof, an electrically conductive coating upon the outwardly facing surface of said glass panel, electrodes carried along two opposite marginal edges of the panel and contacting the electrically conductive coating, electrical connections passing through the metallic separator means and connected with said electrodes, means insulating the connections from the metallic separator, and insulating blocks disposed between the separator means and glass panel at the corners thereof for supporting said panel in spaced relation to the separator means and to the glass sheets.

ROMEY A. GAISER.
CHARLES M. BROWNE.

REFERENCES CITED

The following references are of record in the file of this patent:

UNITED STATES PATENTS

| Number | Name | Date |
|---|---|---|
| 957,728 | Bliss | May 10, 1910 |
| 1,117,128 | Camm | Nov. 10, 1914 |
| 2,209,527 | Knudsen | July 30, 1940 |
| 2,235,681 | Haven et al. | Mar. 18, 1941 |
| 2,429,420 | McMaster | Oct. 21, 1947 |
| 2,441,831 | Moore | May 18, 1948 |
| 2,497,507 | McMaster | Feb. 14, 1950 |
| 2,513,993 | Burton | July 4, 1950 |